Sept. 26, 1967  R. C. MORELL ETAL  3,343,744
BOX CONSTRUCTION AND BLANK THEREFOR
Filed Aug. 25, 1964  3 Sheets-Sheet 1

Inventors
Richard C. Morell
Claude L. Gilbert
By
Pendleton, Neuman,
Seibold & Williams
Attorneys

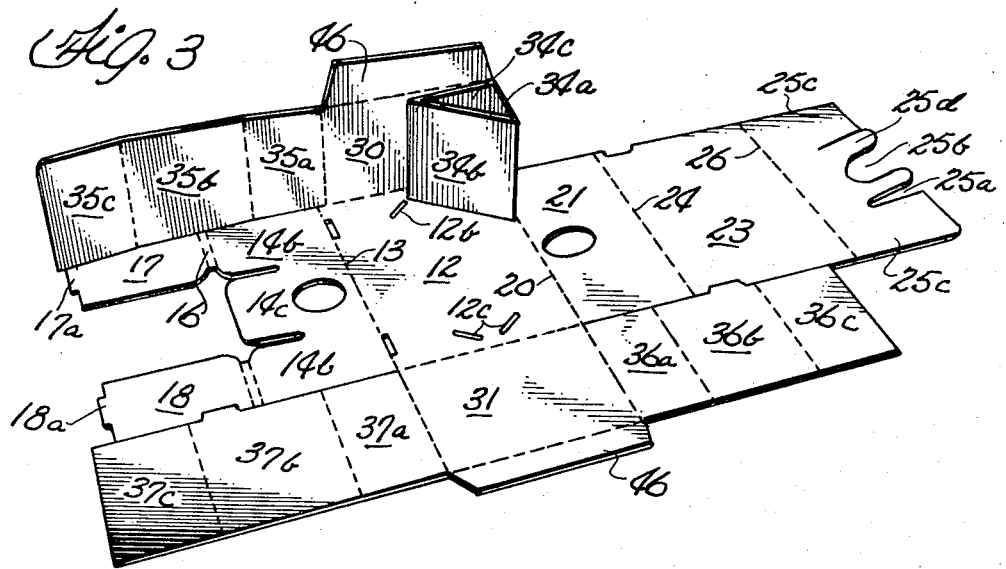
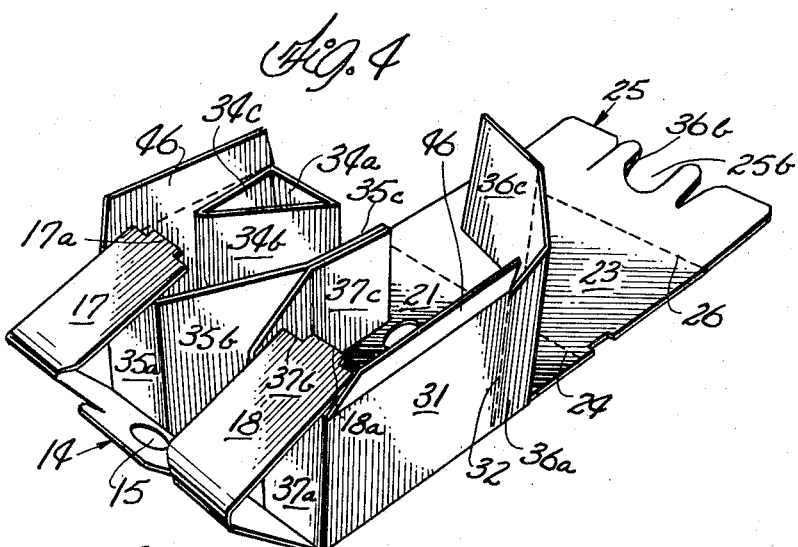
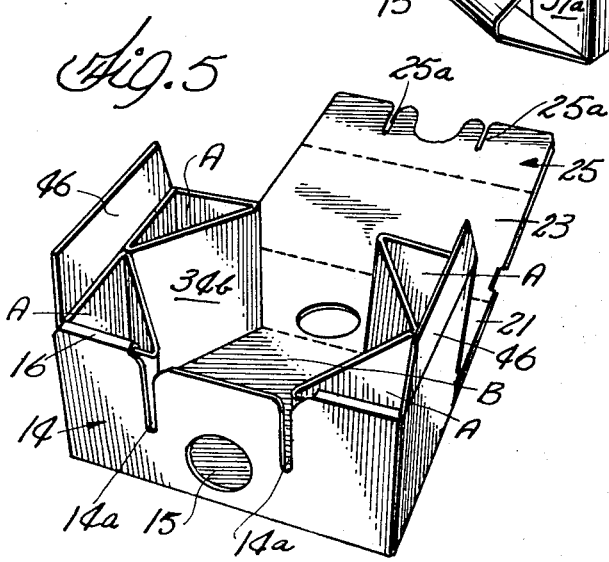

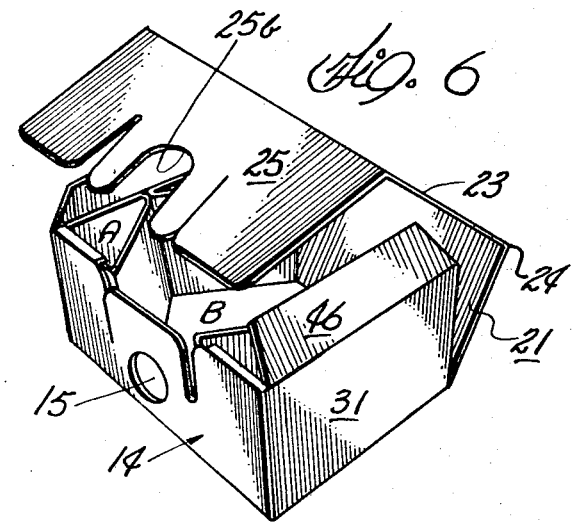
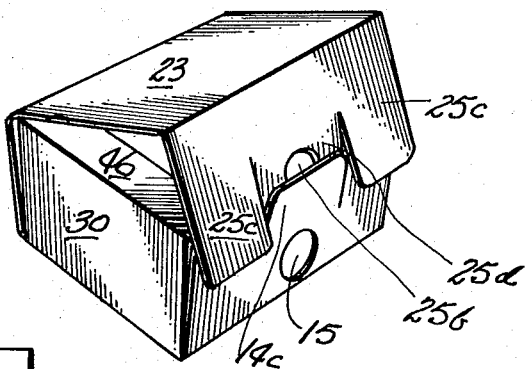
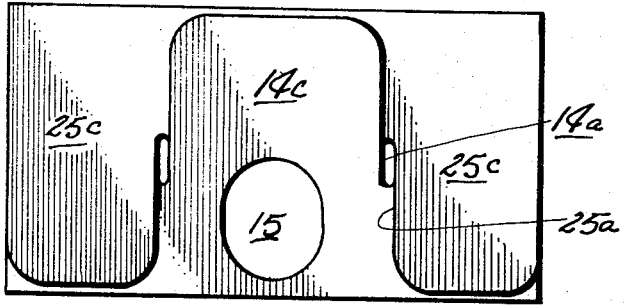
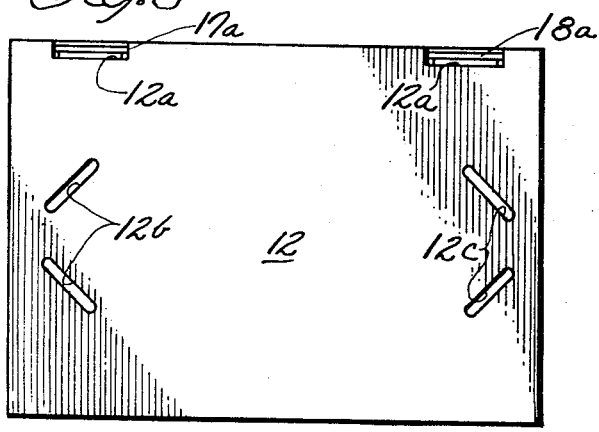

United States Patent Office 3,343,744
Patented Sept. 26, 1967

3,343,744
BOX CONSTRUCTION AND BLANK THEREFOR
Richard C. Morell, Denver, and Claude L. Gilbert, Derby, Colo., assignors to Packaging Corporation of America, Evanston, Ill., a corporation of Delaware
Filed Aug. 25, 1964, Ser. No. 391,917
8 Claims. (Cl. 229—27)

This invention relates to a box construction and the blank therefor. The blank is preferably formed from a sheet of relatively stiff fibreboard. The illustrated box construction is of a type suitable for use as a bait box adapted to catch rodents or other similar animals. The invention will hereinafter be described with reference to the illustrated embodiment; however, it is to be understood that the invention is not to be limited thereto.

Heretofore various bait boxes and traps have been provided which because of their design are of bulky and costly construction and are not capable of being readily collapsed for storage or transporting when not in use. Because of necessity, these prior boxes either of weighty construction or required bricks, stones, or other weighty objects to be placed thereupon in order to prevent the box from being dragged away by the animal being sought, or moved by a strong wind. Furthermore, with such prior constructions removal of the trapped animal or replenishing of the bait was oftentimes an awkward and frustrating experience.

Thus, it is an object of this invention to provide a box construction which is suitable to function as a bait box and yet is not beset with the aforenoted shortcomings.

It is a further object of this invention to provide a box construction which may be readily set up from a blank at the time of use.

It is a further object of this invention to provide a foldable box construction wherein a plurality of box blanks may be arranged in stacked relation, and thus enable a large number of such blanks to be transported or stored as a compact unit.

It is a still further object of this invention to provide a box construction which may readily be set up without the need for adhesives, tape, or staples.

It is a still further object of this invention to provide a bait box construction which is strong and sturdy and capable of withstanding abusive handling and may be weighted, if desired, without disturbing the bait area or requiring such weight to be removed before access to the interior of the box is effected for replenishing the bait or removing a trapped animal.

Further and additional objects will appear from the description, accompanying drawings, and appended claims.

In accordance with one embodiment of this invention a box construction is provided which is formed from a sheet of relatively stiff, yet bendable, material. The box comprises a bottom delimited by a plurality of upright wall panels foldably connected to the periphery of said bottom. At least one of the wall panels has foldably connected thereto a multi-fold flap which is disposed within the box interior and, when in a predetermined position of fold, forms the box interior into a plurality of compartments. The multi-fold flap is provided with means which interlockingly engages the bottom and effects retention of said flap in the said predetermined position of fold within the box interior.

For a more complete understanding of this invention reference should be made to the drawings wherein:

FIGS. 3–7 are perspective views on reduced scale showing successive steps in the setting up of the box shown in FIG. 1.

FIG. 8 is a front elevational view of the improved box construction showing the cover thereof in closed position.

FIG. 9 is a bottom view of the box construction shown in FIG. 8.

Figure 1:
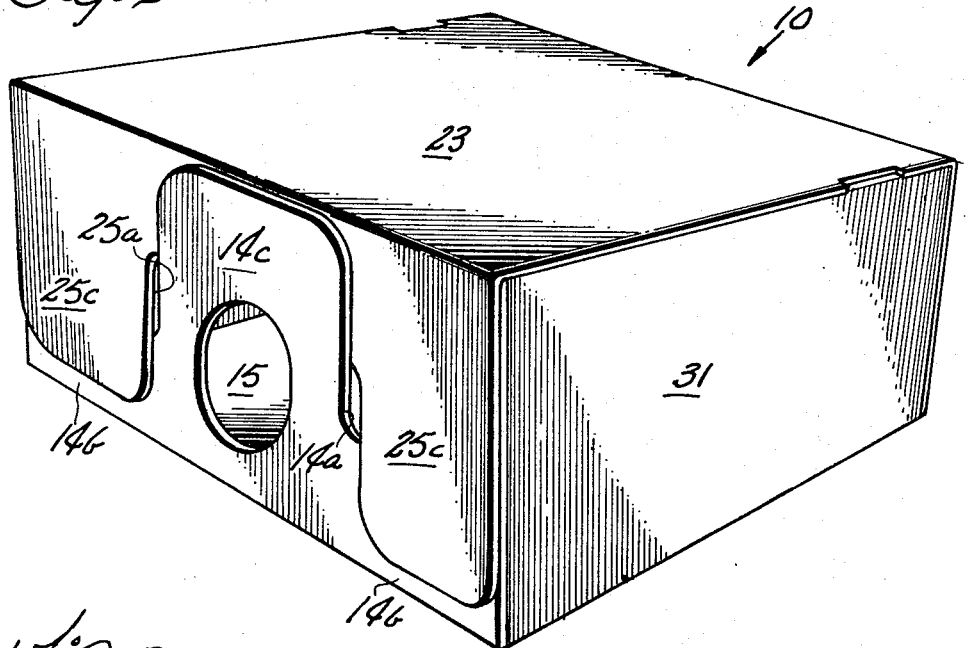
FIG. 1 is an enlarged perspective view of the front of one embodiment of the improved box construction.
Figure 2:
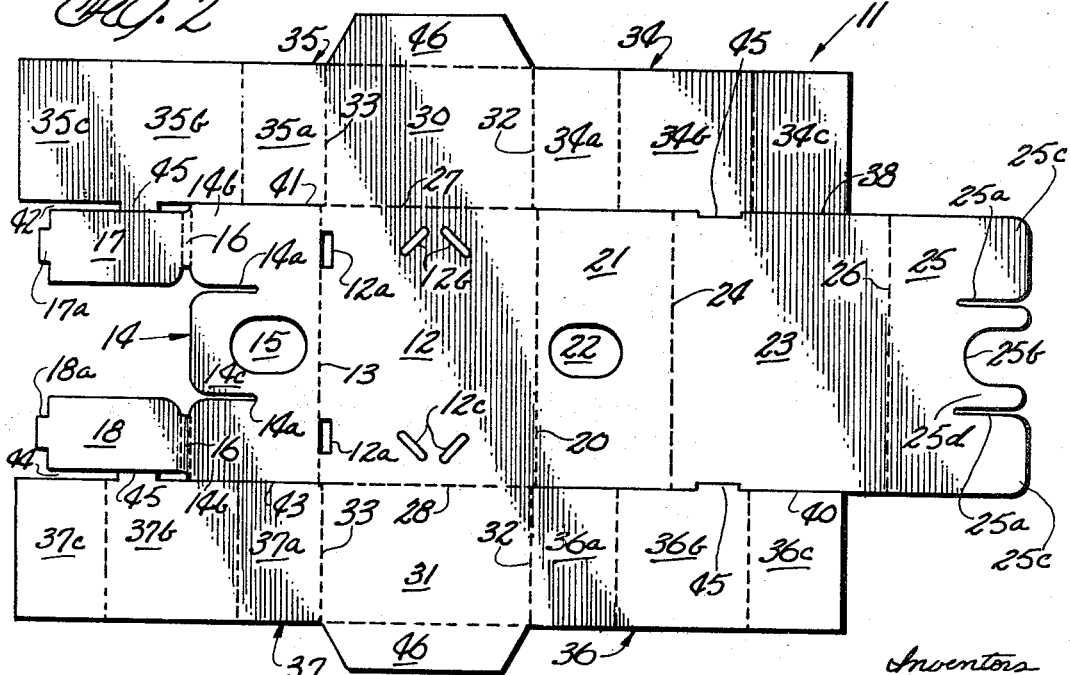
FIG. 2 is a plan view of a blank adapted to form the box shown in FIG. 1.

Referring now to the drawings and more particularly to FIGS. 1 and 2, one embodiment of the improved box construction 10 is shown which in this instance is particularly suitable for use as a bait box for animals such as rodents and the like.

Box 10 is set up or formed from a single blank 11 of stiff bendable sheet material (e.g., double faced corrugated boxboard). Various other types of material may be utilized depending upon the intended use of the box. When the box 10 is used as a bait box, it is recommended that the blank-forming sheet material be treated, either by impregnation or coating, with a moisture-repellent composition so that the box will withstand a wide range of climatic or environmental conditions.

Blank 11, as shown in FIG. 2, comprises an elongated bottom panel 12 having a pair of spaced, aligned, elongated slots 12a formed adjacent a perimetal segment thereof. Two pairs of slots 12b and 12c are also formed in the bottom panel 12. In the illustrated embodiment, the slots comprising each pair 12b or 12c are angularly disposed with respect to one another. The pairs of slots 12b and 12c are arranged in spaced relation and are in substantial alignment with the longitudinal central axis of the bottom panel. The reason for the angular disposition of the slots comprising each pair of slots 12b and 12c will become apparent hereinafter.

Connected by a foldline 13 to one side of bottom 12 is a front panel 14. An enlarged opening 15 is formed in panel 14 adjacent foldline 13. The opening 15 is an access opening for an animal into the interior of the box 10 when it is set up as shown in FIG. 1.

Connected by wide, or double, foldlines 16 to the free edge of front panel 14 is a pair of spaced locking flaps 17 and 18. Projecting from the outer, or distal, edge of each flap 17 or 18 is a tab 17a or 18a, which interlockingly engage the corresponding slots 12a formed in bottom panel 12, when the blank is set up to form the box 10.

Formed in the free edge of front panel 14 and intermediate flaps 17 and 18 is a pair of spaced, open-end, elongated slots 14a. The functions of slots 14a and flaps 17 will be discussed more fully hereinafter. Each slot 14a is spaced from opening 15 and extends approximately one-half the height of the front panel 14.

Connected by foldline 20 to the opposite edge, or side, of bottom panel 12 is a rear panel 21. In the illustrated embodiment, an opening 22, similar to opening 15, is formed in rear panel 21. If desired, the size, shape, location, and number of openings formed in the box walls may be varied from that shown. The heights of the front and rear panels are substantially the same.

A cover panel 23 is connected by a foldline 24 to the outer edge of rear panel 21. Foldlines 20 and 24 are in spaced parallel relation. The cover panel 23 is approximately the same size and shape as bottom panel 12.

A closing flap 25 is connected by foldline 26 to the outer edge of cover panel 23. The outer, or distal, edge of flap 25 is provided with a pair of spaced, open end, elongated slots 25a. Intermediate slot 25a is an enlarged substantially semi-cylindrically shaped slot 25b. As seen in FIGS. 1 and 7, the slots 14a of front panel 14 and slots 25a of closing flap 25, permit bayoneting interlocking engagement between panel 14 and flap 25 whereby the cover panel 23 is frictionally held in closed position with respect to the top of the box 10, see FIG. 1. It will be noted that the end portions 25c of flap 25 overlie corresponding portions 14b of the front panel and that central portion 25d of flap 25 is overlapped by a corresponding portion 14c of the front panel.

Connected by foldlines 27 and 28 to opposite sides of bottom panel 12 and intermediate foldlines 13 and 20 are side panels 30 and 31. Each side panel cooperates with front and rear panels 14 and 21, respectively, so as to form a continuous upright wall which delimits bottom panel 12 when the blank is set up. Connected by foldlines 32 and 33 and extending laterally from each side panel 30 or 31 are multi-fold flaps 34, 35, 36, and 37. Each multi-fold flap is of like construction and therefore only one such flap will be described in detail hereinafter, and corresponding portions thereof will be similarly marked on the remaining flaps.

Multi-fold flap 34, in the illustrated embodiment, includes an inner section 34a foldably connected to the side panel 30, an intermediate section 34b foldably connected to section 34a, and an outer section 34c foldably connected to section 34b. Multi-fold flap 34 is separated from rear panel 21 and cover panel 23 by an elongated cut or slit 38. Multi-fold flap 36 in a like manner is separated from panels 21 and 23 by a cut or slit 40.

Multi-fold flap 35 is separated from front panel 14 by a cut or slit 41 and from locking flap 17 by a wide slot 42, the latter being aligned with cut 41. Similarly flap 37 is separated from front panel 14 by a cut or slit 43 and from locking flap 18 by a wide slot 44.

Projecting from the periphery of the intermediate section 34b, 35b, 36b, or 37b of the respective flap 34, 35, 36, or 37 is a tab 45. When the blank is set up and each multi-fold flap assumes a predetermined position of fold as will hereinafter be described, the tab 45 in each instance will interlockingly engage a corresponding slot of the pairs of slots 12b and 12c; and thus serve to retain the flap in its predetermined position of fold.

The inner, intermediate, and outer sections of each flap 34, 35, 36, or 37, when set up to assume its predetermined position of fold, form a peripheral triangularly-shaped interior compartment A see FIGS. 3–5. Each triangular compartment A is disposed adjacent the juncture of the side panels 30 and 31 and the front and rear panels 14 and 21, respectively. Peripheral compartments A cooperate to form a larger interior central compartment B, see FIG. 5. Access by an animal to compartment B is effected through openings 15 and 22. Triangular compartments A extend the full height of the box and are adapted to be filled with sand, gravel or the like so as to provide the necessary weight to prevent the set-up box from being moved either by wind or by an animal seeking the bait which is normally placed within the central compartment B. Where the box 10 is utilized in connection with the extermination of rodents and the like, the bait, not shown, is impregnated with a suitable poison.

In addition to forming suitable compartments within the interior of the box 10, the multi-fold flaps 34, 35, 36, and 37 provide added strength for the box against crushing.

As seen in FIG. 2 side panels 30 and 31 are each provided with a tuck flap 46 which subtends the cover panel 23 when the latter is in a closed position, see FIG. 7.

The number of multi-fold flaps may be less that that shown and the shape of compartment A may be other than triangular if desired.

It will be noted in FIG. 4 that, when multi-fold flaps 35 and 37 are being folded so as to form the compartments A, the locking flaps 17 and 18, respectively, are folded about double foldlines 16 and sandwich inner sections 35a and 37a between respective locking flaps 17 and 18 and the portions 14b of front panel 14. The tabs 17a and 18a on the locking flaps snap into interlocking relation with slots 12a formed in the bottom panel 12 and thus retain sections 35a and 37a in the aforesaid sandwiched relation.

It will be noted in FIGS. 5 and 6 that rear panel 21 is connected only to bottom panel 12 and not to side panels 30 and 31, thus, when the cover panel 23 is open, access to the interior of the box may be effected either from the top or from the rear side to facilitate either replenishing of the bait or removing of a trapped animal.

In setting up the box 10 from blank 11, the side panels 30 and 31 and the multi-fold flaps connected thereto are moved to upright positions with respect to the bottom panel 12, see FIGS. 3 and 4. Multi-fold flaps 34 and 36 are then folded relative to the respective side panels 30 and 31 so as to form the triangular compartments A. It is important that tabs 45 of fold sections 34b and 36b be moved into interlocking engagement with slots 12b and 12c, respectively, whereupon the multi-fold flaps 34 and 36 will be retained in their predetermined, or triangular compartment-forming, positions of fold.

The inner sections 35a and 37a of flaps 35 and 37 are then folded toward one another and at substantially right angles with respect to side panels 30 and 31, respectively. Front panel 14 and the locking flaps 17 and 18 connected thereto are then moved to an upright position with respect to bottom panel 12. Flaps 17 and 18 are then folded downwardly relative to front panel 14 about foldline 16 as an axis, so that inner sections 35a and 37a are sandwiched between flaps 17 and 18 and respective portions 14b of the front panel 14. The tabs 17a and 18a of the locking flaps 17 and 18 interlock with the slots 12a formed in bottom panel 12, and thus retain the front panel and side panels in upright positions.

As aforementioned, while the invention has been described in regard to a bait box, it is not to be limited thereto. For example, the box may be coverless in which case the front and rear panels may be of like configuration with both having locking flaps connected thereto. Furthermore, the box interior may be formed into a fewer or greater number of compartments than that shown. The access openings may be eliminated entirely or a fewer or greater number provided.

Thus, it will be seen that a simple, yet sturdy, and inexpensive box construction has been provided which may be readily set up when desired without the need for adhesive, tape or staples. The box is readily collapsible, when desired, for storage or shipping in bulk. Where the box is used as a bait box, the latter may be readily weighted, if desired, without interfering in any way with the opening or closing thereof or the bait accommodating area.

While several embodiments of this invention are shown above, it will be understood of course that the invention is not to be limited thereto, since many modifications may be made, and it is contemplated, therefore, by the appended claims to cover any such modifications as fall within the true spirit and scope of this invention.

We claim:
1. A box construction formed from a sheet of foldable material, comprising a bottom, wall panels delimiting said bottom and disposed upright with respect thereto, at least one of said wall panels being provided with an opening for access to the interior of said box; a cover foldably connected to one of said wall panels for closing the top of said box, said cover including a closing flap interlocking with one of the other wall panels when said cover is in a closed position, the wall panel to which said cover is foldably connected being free of the other wall panels for folding relative to said bottom when said cover is in an open position; and flap means disposed within the interior of said box and cooperating with said wall panels to form a plurality of spaced peripheral compartments and a central compartment, the opening in said one wall panel being in communication with only said central compartment.

2. The box construction recited in claim 1 wherein said peripheral compartments extend the full height of said box.

3. The box construction recited in claim 1 wherein said plurality of peripheral compartments are located at corners formed by adjacent wall panels.

4. A box construction formed from a sheet of foldable material, comprising a bottom; a front wall; a rear wall; a pair of side walls, said front, rear, and side walls delimiting said bottom and being foldably connected thereto, said rear wall being provided with an opening for access to the interior of said box; a cover foldably connected to said rear wall for closing the top of said box, said cover including a closing flap interlocking with said front wall when said cover is in a closed position; and multi-fold flaps foldably connected to said side walls and disposed within the interior of said box and cooperating with said walls to form a plurality of peripheral compartments and a central compartment, each multi-fold flap being provided with means interlockingly engaging said bottom to hold said flap in a predetermined position of fold within said box interior, each multi-fold flap being substantially the same height as the side wall to which it is attached, the opening in said rear wall communicating only with said central compartment.

5. A blank of foldable sheet material for use in forming a box, said blank comprising a bottom panel; a front panel foldably connected to one side of said bottom panel, said front panel being provided with an opening adjacent said front panel foldline connection; a pair of spaced locking flaps foldably connected to a side of said front panel opposite that connected to said bottom panel, the portion of the side of said front panel intermediate said locking flaps being provided with a pair of elongated open end slots; a rear panel foldably connected to the opposite side of said bottom panel, said rear panel being provided with an opening adjacent said rear panel foldline connection; a cover panel foldably connected to the side of said rear panel opposite that connected to said bottom panel; a closing flap foldably connected to said cover panel, the line of fold of said closing flap being substantially parallel to the line of fold between said cover panel and said rear panel, the edge of said closing flap opposite the edge thereof connected to said cover panel being provided with a pair of spaced elongated open end slots which are adapted to interlockingly engage the slots formed in said front panel when said blank is set up to form a box and said cover panel is in a closed position; and a pair of opposed side panels foldably connected to the sides of said bottom panel intermediate the sides thereof to which said front and rear panels are connected, said front, rear, and side panels cooperating with one another to delimit said bottom panel, when said blank is set up to form a box; and multi-fold flaps foldably connected to opposed sides of said side panels, said opposed sides being substantially transverse with respect to the line of fold between the bottom panel and a side panel, each multi-fold flap extending laterally from said side panel and, when said blank is set up, effecting division of the box interior into a plurality of compartments.

6. A box construction formed from a sheet of foldable material, comprising a bottom; wall panels delimiting said bottom and disposed upright with respect thereto, one of said wall panels being provided with an opening for access to the interior of said box; flap means foldably connected to a wall panel and disposed within the interior of said box and forming a plurality of interior spaced peripheral compartments and a central compartment, the opening in said one wall panel communicating only with said center compartment; and a cover foldably connected to a wall panel and adapted to overlie and close the top of said box; said flap means, when in a predetermined position of folded relation, interlockingly engaging said bottom.

7. A blank of foldable sheet material for use in forming a box, said blank comprising a bottom panel; a front panel foldably connected to one side of said bottom panel; locking flaps foldably connected to a side of said front panel opposite that connected to said bottom panel, said locking flaps being provided with tabs which interlockingly engage slots formed in said bottom panel when said blank is set up to form a box; a rear panel foldably connected to the opposite side of said bottom panel; a cover panel foldably connected to the side of said rear panel opposite that connected to said bottom panel; a pair of opposed side panels foldably connected to the sides of said bottom panel intermediate the sides to which said front and rear panels are connected; and multi-fold flaps foldably connected to each of said side panels along lines of fold disposed transversely with respect to the lines of fold connecting said side panels to said bottom panel, said multi-fold flaps being separated from said front panel and the locking flaps connected thereto and said rear panel by elongated cuts, said multi-fold flaps, when said blank is set up to form a box, being adapted to divide the box interior into a plurality of compartments and said locking flaps overlying certain of said multi-fold flaps and retaining same in predetermined positions of fold.

8. The blank recited in claim 7 wherein each of said multi-fold flaps is provided with tabs and said bottom panel is provided with a plurality of second slots which are adapted to interlockingly accommodate said multi-fold flap tabs and effect retention of said multi-fold flaps in said predetermined positions of fold.

References Cited

UNITED STATES PATENTS 3,184,136   5/1965   Forbes _____ 229—49

FOREIGN PATENTS 777,366   6/1957   Great Britain.
623,161   1/1961   Italy.

JOSEPH R. LECLAIR, *Primary Examiner.*

GEORGE O. RALSTON, *Examiner.*

R. PESHOCK, *Assistant Examiner.*